United States Patent
Garon et al.

(10) Patent No.: US 11,281,785 B2
(45) Date of Patent: Mar. 22, 2022

(54) PREVENTING DATA LEAKAGE

(71) Applicant: Google LLC, Mountain View, CA (US)

(72) Inventors: Haskell Aaron Garon, Brooklyn, NY (US); Don Greenberg, Teaneck, NJ (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 16/474,642

(22) PCT Filed: May 17, 2017

(86) PCT No.: PCT/US2017/033007
§ 371 (c)(1),
(2) Date: Jun. 28, 2019

(87) PCT Pub. No.: WO2018/212769
PCT Pub. Date: Nov. 22, 2018

(65) Prior Publication Data
US 2019/0325151 A1 Oct. 24, 2019

(51) Int. Cl.
*G06F 21/60* (2013.01)
*G06F 21/54* (2013.01)
(Continued)

(52) U.S. Cl.
CPC ............ *G06F 21/604* (2013.01); *G06F 21/54* (2013.01); *G06F 21/552* (2013.01); *G06F 21/554* (2013.01); *G06F 21/62* (2013.01)

(58) Field of Classification Search
CPC ...... G06F 21/54; G06F 21/552; G06F 21/554; G06F 21/604; G06F 21/62
See application file for complete search history.

(56) References Cited

U.S. PATENT DOCUMENTS

2003/0014347 A1    1/2003  Tiefenbrun
2008/0104393 A1    5/2008  Glasser et al.
(Continued)

FOREIGN PATENT DOCUMENTS

CN    1470972    1/2004
CN    1579079    2/2005
(Continued)

OTHER PUBLICATIONS

Panagiotis Papadimitriou • Hector Garcia-Molina; Data Leakage Detection; IEEE Transactions on Knowledge and Data Engineering (vol. 23, Issue: 1, pp. 51-63); (Year: 2011).*
(Continued)

*Primary Examiner* — Luu T Pham
*Assistant Examiner* — Chao Wang
(74) *Attorney, Agent, or Firm* — Fish & Richardson P.C.

(57) ABSTRACT

Methods, systems, and apparatus, including an apparatus for preventing data leakage by controlling the availability of user data. In one aspect, a system includes a frontend server that receives digital component requests that each specify a user identifier for a user to which digital component will be provided and provides digital components. A data availability control server receives data specifying a user identifier for a user and controls availability of activity data to digital component providers by identifying, for a given digital component provider, data sets that include a user identifier for the user and are data sets from which the digital component provider is eligible to receive data. The data availability control server selects, from a specified number of the identified data sets, the activity data of the user included in the specified number of identified data sets and provides the selected data to the given digital component provider.

20 Claims, 4 Drawing Sheets

(51) Int. Cl.
*G06F 21/55* (2013.01)
*G06F 21/62* (2013.01)

(56) References Cited

U.S. PATENT DOCUMENTS

| | | | |
|---|---|---|---|
| 2009/0299868 A1 | 12/2009 | O'Leary | |
| 2011/0258064 A1 | 10/2011 | Agarwal et al. | |
| 2012/0054043 A1* | 3/2012 | Agarwal | G06Q 30/0275 705/14.71 |
| 2012/0059717 A1 | 3/2012 | Furman et al. | |
| 2014/0244406 A1 | 8/2014 | Garcia-Martinez | |
| 2014/0257999 A1 | 9/2014 | Garcia-Martinez | |
| 2015/0067086 A1* | 3/2015 | Adriaens | G06F 15/17331 709/212 |
| 2015/0372886 A1* | 12/2015 | Paul | H04L 43/04 709/224 |
| 2016/0335017 A1 | 11/2016 | Itoh | |

FOREIGN PATENT DOCUMENTS

| | | |
|---|---|---|
| CN | 104813326 | 7/2015 |
| KR | 10-2016-0092021 | 8/2015 |
| WO | 2006/076520 | 7/2006 |
| WO | 2006/083958 | 8/2006 |

OTHER PUBLICATIONS

Seokhee Lee • Keungi Lee • Savoldi, A. • Sangjin Lee; Data Leak Analysis in a Corporate Environment; 2009 Fourth International Conference on Innovative Computing, Information and Control (ICICIC) (pp. 38-43); (Year: 2009).*

Madhavi Suryawanshi • Sarita Patil; Avoiding the data leakage and providing privacy to data in networking; 2016 International Conference on Computing Communication Control and automation (ICCUBEA) (pp. 1-4); (Year: 2016).*

KR Office Action in Korean Application No. 10-2019-7026854, dated Nov. 20, 2020, 10 pages (with English translation).

PCT International Preliminary Report on Patentability in International Application No. PCT/US2017/033007, dated Nov. 28, 2019, 9 pages.

PCT International Search Report and Written Opinion in International Application. No. PCT/US2017/033007, dated Jul. 31, 2017, 14 pages.

Office Action in Chinese Appln. No. 201780002727.5, dated Oct. 11, 2021, 12 pages (with English translation).

Office Action in Indian Appln. No. 201927031807, dated Nov. 10, 2021, 7 pages (with English translation).

* cited by examiner

PREVENTING DATA LEAKAGE

This application is a national stage application, filed under 35 U.S.C. § 371 of PCT International Application No. PCT/US2017/033007, filed on May 17, 2017, which is incorporated by reference herein in its entirety.

BACKGROUND

Various information about Internet-based activity is shared among Internet content providers to improve the likelihood that appropriate content is being provided to users. However, it is difficult to control the use of shared data once it has been shared with a third-party on the Internet.

SUMMARY

This specification describes technologies relating to controlling access to data in ways that prevent leakage (e.g., unauthorized use) of the data, and optimize use of computing and network resources for such data access to ensure efficient operation.

In general, one innovative aspect of the subject matter described in this specification can be embodied in systems that include one or more data storage devices that store data sets. Each data set can include (i) one or more user identifiers for users that have visited an electronic resource of a respective publisher from which the data set originated and, for each user, (ii) activity data describing one or more actions performed by the user with respect to the electronic resource. The systems can include one or more front-end servers that receive digital component requests that each specify a user identifier for a user to which digital component will be provided in response to the digital component request and provide digital components in response to the digital component requests. The systems can include one or more data availability control servers in data communication with the one or more data storage devices and the one or more front-end servers. The one or more data availability control servers can receive, from the one or more front-end servers, data specifying a given user identifier for a given user specified by a given digital component request. The one or more data availability control servers can control availability of activity data to digital component providers by identifying, for a given digital component provider, data sets that (i) include a user identifier for the given user and (ii) are data sets from which the digital component provider is eligible to receive data, selecting, from a specified number of the identified data sets, the activity data of the given user included in each data set of the specified number of identified data sets, and providing the selected data to the given digital component provider. Other implementations of this aspect include corresponding apparatus, methods, and computer programs, configured to perform the actions of the methods, encoded on computer storage devices.

These and other implementations can each optionally include one or more of the following features. In some aspects, the one or more data availability control servers provide the selected data to the given digital component provider without providing activity data for the given user included in any data set other than each data set of the specified number of the identified data sets. In some aspects, the one or more data availability control servers provide, in response to the given digital component request, only data for the given user to the given digital component provider.

In some aspects, the one or more front-end servers provide a digital component of the given digital component provider to a user device of a user identified by the given user identifier based on data received from the given digital component provider in response to receiving the selected data. Each data set can include one or more tuples of data and each tuple includes data types selected by the publisher from which the data set was received.

In some aspects, the one or more front-end servers receive activity data requests that each specify a user identifier for a user for which activity data is requested and provide activity data in response to the activity data requests. The one or more data availability control servers can receive, from the one or more front-end servers, data specifying a particular user identifier for a particular user specified by a particular activity data request received from a particular entity. The one or more data availability control servers can also identify data sets that (i) include a user identifier for the particular user and (ii) are data sets from which the particular entity is eligible to receive data and determine that the particular entity has not requested activity data for greater than a threshold number of users during a specified time period. In response to determining that particular entity has not requested activity data for greater than a threshold number of users during a specified time period, the one or more data availability control servers can select, from a specified number of the data sets, the activity data of the particular user included in each data set of the specified number of the data sets and provide the selected data to the particular entity.

Determining that the particular entity has not requested activity data for greater than a threshold number of users during a specified time period can include determining a number of activity data requests received from the particular entity that specified a user identifier that matched a user identifier of one or more data sets received from a particular publisher and determining that the number of activity data requests is not more than a threshold specified by the particular publisher.

In general, another aspect of the subject matter described in this specification can be embodied in systems that include one or more data storage devices that store data sets received from publishers. Each data set can include (i) one or more user identifiers for users that have visited an electronic resource of the publisher from which the data set was received and, for each user, (ii) activity data describing one or more actions performed by the user with respect to the electronic resource. The systems can include one or more front-end servers that receive digital component requests that each specify a user identifier for a user to which digital component will be provided in response to the digital component request and provide digital components in response to the digital component requests. The systems can include one or more data leakage servers in data communication with the one or more data storage devices and the one or more front-end servers. The one or more data leakage servers can receive, from the one or more front-end servers, data specifying a given user identifier for a given user specified by a given digital component request. The one or more data leakage servers can prevent leakage of activity data to digital component providers by identifying, for a given digital component provider, data sets that (i) include a user identifier for the given user and (ii) are data sets from which the digital component provider is eligible to receive data, selecting, from a specified number of the identified data sets, the activity data of the given user included in each data set of the specified number of identified data sets, and providing the selected data to the given digital component provider.

In some aspects, the one or more data leakage servers can provide the selected data to the given digital component provider without providing activity data for the given user included in any data set other than each data set of the specified number of the identified data sets. In some aspects, the one or more data leakage servers provide, in response to the given digital component request, only data for the given user to the given digital component provider.

In some aspects, the one or more front-end servers provide a digital component of the given digital component provider to a user device of a user identified by the given user identifier based on data received from the given digital component in response to receiving the selected data. Each data set can include one or more tuples of data and each tuple can include data types selected by the publisher from which the data set was received.

In some aspects, the one or more front-end servers receive activity data requests that each specify a user identifier for a user for which activity data is requested and provide activity data in response to the activity data requests. The one or more data leakage servers can receive, from the one or more front-end servers, data specifying a particular user identifier for a particular user specified by a particular activity data request received from a particular entity. The one or more data leakage servers can also identify data sets that (i) include a user identifier for the particular user and (ii) are data sets from which the particular entity is eligible to receive data and determine that the particular entity has not requested activity data for greater than a threshold number of users during a specified time period. In response to determining that particular entity has not requested activity data for greater than a threshold number of users during a specified time period, the one or more data leakage servers can select, from a specified number of the data sets, the activity data of the particular user included in each data set of the specified number of the data sets and provide the selected data to the particular entity.

In some aspects, determining that the particular entity has not requested activity data for greater than a threshold number of users during a specified time period can include determining a number of activity data requests received from the particular entity that specified a user identifier that matched a user identifier of one or more data sets received from a particular publisher and determining that the number of activity data requests is not greater than a threshold specified by the particular publisher.

As described above, it is difficult to control the use of shared data once it has been shared with a third-party on the Internet. Further use or further sharing of such data without permission, besides being unauthorized, can cause a number of further problems affecting the effective operation of computing and network resources being used to implement such information sharing. Unauthorized use results in an unnecessary load on these valuable computing and network resources. Furthermore, it is almost impossible to assess how much, if any, of the shared data can actually be used, or will be of further use to the entity or users obtaining such data. This could result in movement of possibly large data files to a number of users over a communication network, sometimes concurrently, where the data within such files are likely to never be accessed or used. This affects the overall efficiency of the computing systems and/or network.

The subject matter described in this specification can be implemented in particular embodiments so as to realize one or more of the following advantages. Leakage of data to unauthorized users (or use for unauthorized purposes) can be prevented or reduced by selectively providing access to only portions of data sets that match a particular request rather than providing entire data sets. Data leakage can also be prevented or reduced by limiting the number of queries or requests for data that can be fulfilled for a given entity over a given time period. By reducing data leakage, user data (which may be anonymized by associating the data with an anonymous identifier) is better protected as entities may only access limited amounts (e.g., less than all) of the data related to the user. By providing limited portions of data included in data sets that match a request, entities can still receive access to relevant data without data providers risking leakage of its data to other entities. In addition to, and related to the above advantages provided by the prevention or reduction of such data leakage, selective access and limited data amount also results in a more effective management and allocation of computing and network resources. This is because, just resources that are required for the respective selective access to, and/or limited amounts of data to be transferred would then be utilized, thereby providing a more secure as well as an optimized computing environment for sharing data with third parties.

The entities that acquire access to data sets and that receive portions of data from the data sets that match particular requests can receive useful data without being burdened by large amounts of irrelevant data. This reduction of data allows computers of the entities to more quickly and more efficiently process the data and reduces the amount of data stored on the computers. For example, the computers can more quickly process a small amount of data included in a digital component request as compared to searching a large database of activity data for data that is relevant to the digital component request. This allows the computers to respond to such requests much more quickly, allowing for the digital component providers to participate in selection processes that are time limited.

This reduction of data also decreases network transmission times and reduces the amount of consumed network bandwidth relative to the amount of bandwidth required to send all of the data. By allowing entities that are interested in acquiring data sets to search or view attributes of data sets, the entities can identify data sets that are most useful to them. This also reduces the likelihood of entities acquiring access to data sets for which the entities have little or no use.

Aggregating data sets that include useful data for digital component providers at a system allows for quicker transfer of the data to the digital component providers. By allowing publishers of resources to select data that is automatically sent to the system when users visit their resources, digital component providers and other entities are able to access useful data that has been previously unavailable or difficult to aggregate. Publishers can benefit by receiving a portion (or all) of an amount provided by digital component providers to access the publishers' data set(s).

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
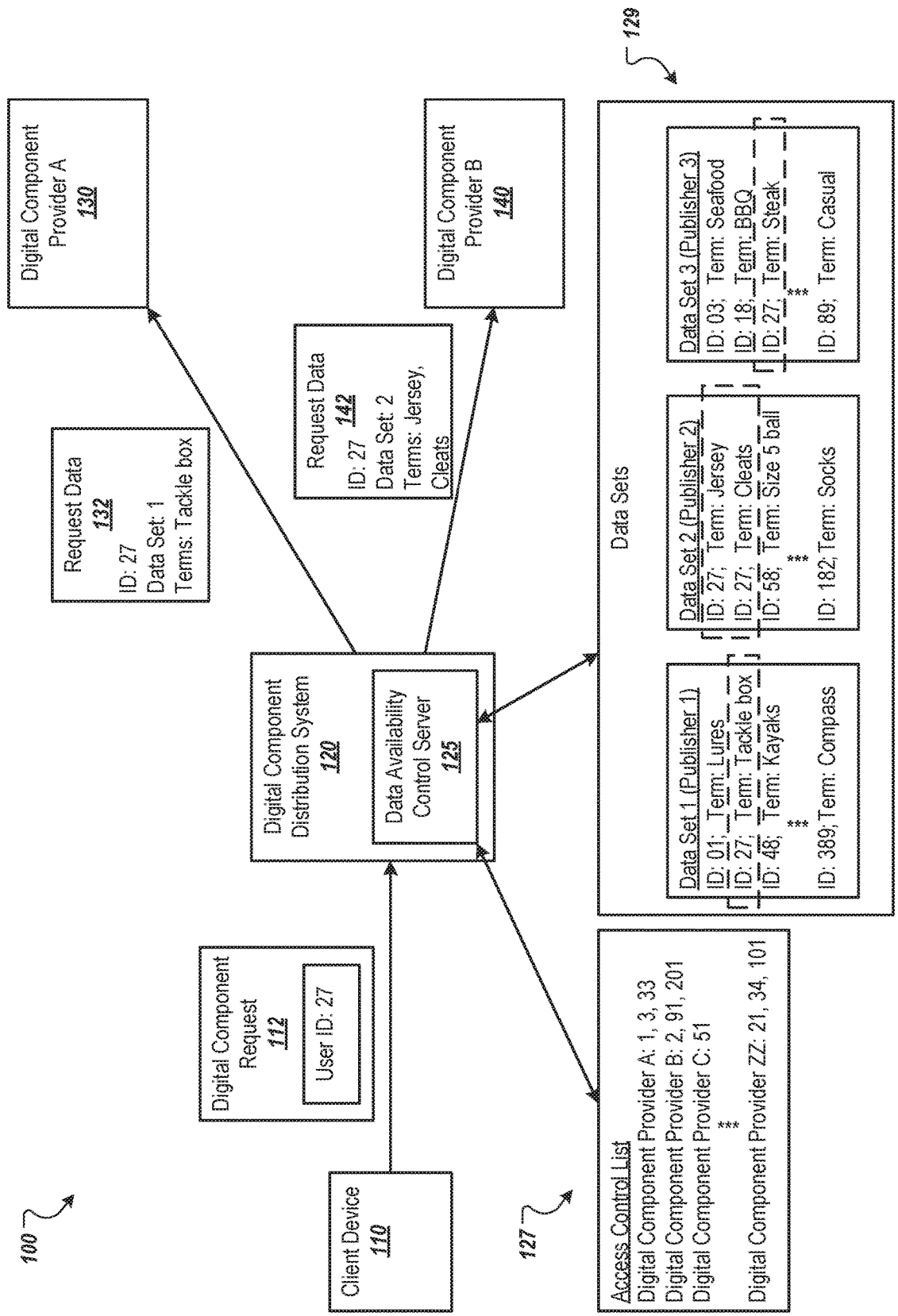
FIG. 1 is a block diagram of an environment in which an example digital component distribution system distributes digital components and prevents data leakage.

In general, systems and techniques described herein can control access to data while preventing or reducing leakage of the data. For example, some entities may accumulate data that is useful to others. If such entities provide the data to others, the entities may no longer be able to control whether the others store the data, reuse the data, or transfer the data to others. For example, if a publisher of a blog about a particular type of product provides data about user-initiated searches performed at the blog to a manufacturer of that type of product for a particular purpose, the manufacturer may store the data, use the data for other purposes, and/or transfer the data to others.

The systems and techniques described herein can provide access to portions of data sets (e.g., less than all of the data in one or more data sets) and/or use of portions of data sets without providing all of the data, thereby limiting the amount of user data that is made available to third-parties. In some implementations, a digital component provider may acquire access to a data set that includes data related to user interactions with an electronic resource (e.g., a web page or mobile application). For example, the data set may include anonymous user identifiers for users that have navigated to the electronic resource and/or activity data describing one or more user interactions with the electronic resource, such as user selected items, items added to a virtual shopping cart, search terms submitted in a search of the electronic resource, articles viewed at the resource, a time at which the user interaction occurred, and/or other appropriate data.

Rather than providing the data set to the digital component provider, the system may store data identifying the data set(s) to which the digital component provider has acquired access. When a request for a digital component is received, the system may identify a user identifier of the digital component request and determine whether the user identifier (or another user identifier for the user) is included in one or more data sets to which the digital component provider has acquired access. If the user identifier is included in a data set to which the digital component provider has acquired access, the system may provide the activity data for the user identifier that is included in the data set to the digital component provider. In this way, the digital component provider does not receive the entire data set in response to a single request. If the user identifier (or another user identifier for the user) is included in multiple data sets to which the digital component provider has acquired access, the system may limit the data provided to the digital component provider to only the data included in a specified number (e.g., one) of the data sets. This further reduces the amount of potential data leakage and protects the user's data.

In some implementations, an entity may acquire the ability to request data included in one or more data sets. For example, a multimedia provider may acquire access to data sets that include user activity data for use in providing multimedia recommendations to the users. Rather than provide the data sets to the multimedia provider, the system may allow the multimedia provider to submit a specified number of requests over a specified time period or receive data for only a specified number of queries over a specified time period. If the request includes a user identifier for a user that is included in a data set to which the multimedia provider acquired access and the multimedia provider has not exceeded the number of requests over the time period, the system may provide user activity data of the user included in the matching data set.

FIG. 1 is a block diagram of an environment 100 in which an example digital component distribution system 120 distributes digital components and controls the availability of data to prevent data leakage. As used throughout this document, the phrase "digital component" refers to a discrete unit of digital content or digital information (e.g., a video dip, audio dip, multimedia dip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. The digital components can be presented by a client device 110. For example, the digital components may be displayed in digital component area of a web page that is displayed in a web browser or in an application page of a mobile application.

A client device 110 is an electronic device that is capable of requesting, receiving, and presenting data. Examples of client devices include personal computers, mobile phones (e.g., smartphones), tablet computers, wearable device (e.g., smart watches), and artificial intelligence assistants ("AI assistants"). Some client devices include user applications, such as a web browser or mobile application, to facilitate the sending and receiving of data over a data communication network. A web browser or mobile application can enable a user to display and interact with text, images, videos, music and other content. AI assistants can provide voice-based user interfaces in which users can request information or content using voice commands.

The digital component distribution system 120 can provide digital components to the client device 110 in response to digital component requests 112 received from the client device 110. For example, a web page or an application page of a mobile application may include code that, when executed by a web browser or the mobile application, causes the client device 110 to submit a digital component request to the digital component distribution system 120.

A digital component request 112 can include a user identifier for a user of the client device 110, e.g., a user identifier associated with the user of the client device 110. The user identifier may be a unique numerical or alpha-numerical sequence that uniquely identifies the user or client device 110 while keeping the user or client device anonymous.

In some implementations, the digital component distribution system 120 can select a digital component to provide in response to a digital component request based on data received from digital component providers, e.g., the digital component provider A 130 and/or the digital component provider B 140. For example, the digital component distribution system 120 may send request data 132 and 142 to the computers of one or more digital component providers to inquire whether the digital component providers 130 A would like to provide a digital component to a client device 110 in response to a digital component request. If so, the digital component provider's computers may provide, to the digital component distribution system 120, data that specifies an amount that the digital component provider is willing to provide to the digital component distribution system if the digital component provider's digital component is selected to be provided to the client device 110. For example, as described in more detail below, the digital component providers' computers may each use one or more rules (or other logic) to determine whether to include a digital component in a digital component selection process and what the amount will be based on information included in the request data received by the computers. In turn, the digital component distribution system 120 may select a digital component based on the data received from the digital component providers' computers and provide the selected digital component to the client device 110 for presentation by the client device 110.

The request data 132 and 142 sent to the digital component providers 130 and 140 can include data related to a digital component presentation slot in which the digital component will be presented. For example, a web page or application page may include one or more digital component slots for presenting digital components. The request data can include, for example, data identifying the web page or application page, the location of the digital component slot on the page, one or more search terms if the page is a search results page, and/or other appropriate data about the digital component slot.

In addition, or in the alternative, the request data 132 and 142 can include data related to a user of the client device 110 at which the digital component will be presented. For example, the request data 132 and 142 can include the user identifier included in the digital component request 112 (or another user identifier for the user). In some implementations, the data related to the user of the client device 110 may only be provided to digital component providers that have acquired access to a data set that includes the user identifier (or another user identifier for the user).

Each data set can include activity data for one or more user identifiers. The activity data can describe user interactions that users associated with the user identifiers have performed at one or more resources. For example, the activity data can specify a resource that the user visited, items selected by the user at the resource, search terms submitted by the user at the resource, articles viewed by the user, a time at which each action occurred, and/or other appropriate activity data.

In some implementations, a user can be associated with multiple user identifiers. For example, a first publisher may assign a given user a first anonymous user identifier when the user visits one of the first publisher's resources. A second publisher may assign the given user a second anonymous user identifier that is different from the first user identifier when the user visits one of the second publisher's resources. The data set may include a universal user identifier for each user. In such implementations, the digital component distribution system 120 may include an index of user identifiers that identifies each publisher's (or other entity's) user identifier with the universal user identifier. In this way, the digital component distribution system 120 can assign activity data received from the publishers to the appropriate universal user identifier and provide the appropriate user identifier to the digital component providers.

A publisher of a resource may provide one or more data sets to the digital component distribution system 120. For example, a publisher of a blog may record data regarding user interactions with its blog. The publisher may generate data sets that include all or a portion of this data. The publisher can select and customize the data included in each data set. For example, the publisher may generate a first data set that includes user identifiers for users that have visited the blog and data specifying the topic of the blog and second data set that includes user identifiers for users that have submitted search queries on the blog and, for each user identifier, the terms or other searchable content submitted by the user. The publisher may send the data set(s) to the digital component distribution system 120.

In some implementations, the publisher's resources provide activity data that describes user interactions with the resources automatically. For example, the publisher may include a tag (e.g., a pixel or beacon) in the code of a web page. The tag can include code, that when executed by a web browser, cause the web browser capture actions or events on the client device 110 and provide the data to the digital component distribution system 120. The publisher can configure the tag to capture and transmit data that the publisher would like to include in a data set, e.g., data that the publisher believes would be useful to digital component providers in determining whether to provide a digital component in response to a digital component request.

Digital component providers 130 and 140 can acquire access to one or more data sets. For example, the digital component providers 130 and 140 may want to provide their digital components to users that have performed certain actions, e.g., visited a particular web page, initiated a search using a particular keyword, viewed a particular item, and/or other appropriate actions. The digital component providers 130 and 140 can each acquire access to data sets that include the user identifiers for users that have performed the actions of interest to the digital component providers 130 and 140. As described in more detail below, the digital component distribution system 120 can provide a user interface that allows digital component providers 130 and 140 to browse or search for data sets and acquire access to one or more of the data sets.

The digital component distribution system 120 can store data sets received from publishers in a data sets storage device 129. In some implementations, the data sets storage device 129 is a cache or other type of fast access memory. Similarly, the digital component distribution system 120 can maintain an access control list 127 that identifies the digital component providers and/or other entities that have acquired access to one or more data sets and, for each entity, the data sets to which the entity has acquired access. In the illustrated example of FIG. 1, the digital component provider A 130 has acquired access to data sets 1, 3, and 33. Similarly, the digital component provider 140 B has acquired access to data sets 2, 91, and 201.

The digital component distribution system 120 includes a data availability control server 125 (also referred to herein as a data leakage server) that controls the availability of activity data included in the data sets. Rather than providing complete data sets to the digital component providers when they acquire access to the data sets, the data availability control server 125 provides a limited amount of data (e.g., less than all of the data) from one or more data sets to digital component providers (or other entities) in response to receiving a digital component request (or an activity data request as described below).

When the digital component distribution system 120 receives a digital component request 112, the data availability control server 125 can select activity data to provide to one or more digital component providers, e.g., the digital component providers 130 and 140. In some implementations, the data availability control server 125 identifies, for a digital component provider, data sets to which the digital component provider has acquired access that includes the user identifier included in the digital component request or another user identifier for the user. The data availability control server 125 can provide activity data for the user that is included in the one or more identified data sets to the digital component provider, e.g., without providing activity data for other users that are not associated with the user identifier included in the digital component request 112 or activity data included in data sets to which the digital component provider has not acquired access. In this way, the availability of the activity data is controlled and entire (or large portions of) data sets are not leaked to others that have not acquired access to the data sets.

In the illustrated example, the received digital component request 112 includes the user identifier 27, which is included in each of data sets 1-3. The digital component provider A 130 has acquired access to data sets 1 and 3 and the digital component provider B 140 has acquired access to data set 2. In this example, the data availability control server 125 can provide, to the digital component provider 130 A, activity data for user identifier 27 that is included in data sets 1 and 3 in the request data 132. However, the data availability control server 125 may not include the activity data for user identifier 27 that is included in data set 2 in the request data 132 as the digital component provider A 130 has not acquired access to data set 2. In addition, the data availability control server 125 may not include activity data for other user identifiers from data set 1 (e.g., other than user identifier 27) in the request data 132 that is sent in response to the digital component request 112, as the digital component request 112 specifies user identifier 27.

Similarly, the data availability control server 125 can provide, to the digital component provider B 140, activity data for user identifier 27 that is included in data set 2 in the requests data 142. However, the data availability control server 125 may not include the activity data for user identifier 27 that is included in data sets 1 or 3 in the request data 142 as the digital component provider A 130 has not acquired access to data sets 1 and 3. In addition, the data availability control server 125 may not include activity data for other user identifiers from data set 2 (e.g., other than user identifier 27) in the request data 142 that is sent in response to the digital component request 112 as the digital component request 112 specifies user identifier 27 rather than another user identifier.

As shown in FIG. 1, the request data 132 includes the user identifier 27, data identifying the data set 1 from which activity data is being provided, and the search term "tackle box" for user identifier 27 included in data set 1. Similarly, the request data 142 includes the user identifier 27, data identifying the data set 2 from which activity data is being provided, and the search terms "jersey, cleats" for user identifier 27 included in data set 2.

In some implementations, the data availability control server 125 can limit the number of data sets from which activity data is provided to a digital component provider or other entity in response to an individual digital component request or activity data request. For example, the system may limit the number of data sets to a specific number of data sets specified by the system or the publisher(s) from which activity data may be provided. More specifically, the system may provide information from fewer than all of the data sets that a particular digital component provider has been granted access.

In the illustrated example, the specified number of data sets may be one. Thus, in this example, the request data 132 does not include the activity data for user identifier 27 that is included in data set 3 although the digital component provider A 130 has acquired access to data set 3. Instead, the request data 132 only includes activity data for user identifier 27 included in one of the data sets, data set 1.

Figure 2:
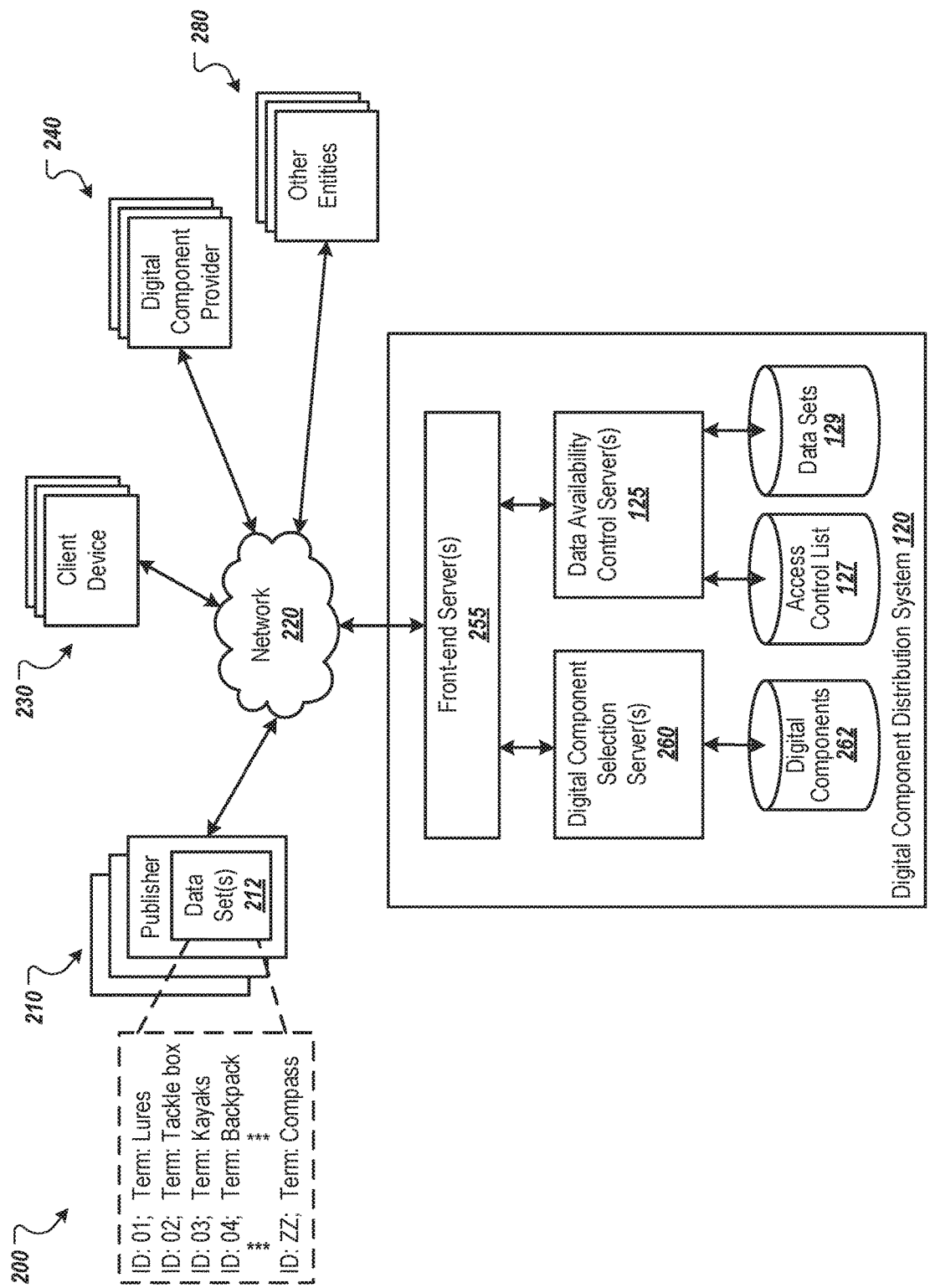
FIG. 2 is a block diagram of an environment in which an example digital component distribution system distributes digital components and prevents data leakage.

Elements of the digital component distribution system 120 are described in more detail with reference to FIG. 2, which is a block diagram of an environment 200 in which an example digital component distribution system 120 distributes digital components and controls the availability of data to prevent data leakage.

The digital component distribution system 120 includes one or more front-end server(s) 255. The front-end server 255 can receive data sets 112 (or data for data sets) from resource publishers 210 or other data sources over a data communication network 220, e.g., a local area network (LAN), a wide area network (WAN), the Internet, a mobile network, or a combination thereof. For example, as described above, a publisher 210 may include a tag (e.g., a pixel or beacon) in the code of a web page that causes the web browser to capture actions or events on a client device 230 and provide the data to the digital component distribution system 120.

A publisher 210 can configure a tag to provide data describing particular actions that occur at the client device 230. For example, a publisher can configure a tag to provide a tuple of data that may be useful to digital component providers, entities that provide recommendations or suggestions, or other appropriate entities. Some example tuples include: (i) a user identifier for a user of the client device 230 and a search term submitted by the user, (ii) a user identifier and an item displayed by the resource and selected by the user, and (iii) a user identifier, a search term submitted by the user, and a first item selected by the user following a return of search results. Other tuples may include a user identifier for a user in combination with one or more of: data identifying a product purchased by the user, data identifying a product added to a virtual shopping cart by the user, a title of an article presented to the user, a period of time that the article was presented, data specifying whether the article was read to completion, a title of a video presented on the client device 230, a period of time the video was presented, and/or data specifying whether the video was viewed to completion, and so on.

The front-send server 255 can receive the tuples of data and provide the tuples of data to the data availability control server 125. The data availability control servers (e.g., data leakage servers) can store tuples of data received from the publishers 210 in the appropriate data set of a data sets storage device 129. For example, when a publisher 210 or the publisher's resource sends a tuple of data the data can include a unique identifier for the publisher 210 or the publisher's data set. The data availability control server 125 can use the identifier(s) to store the data in the appropriate data set, or with a reference to the appropriate data set to which the tuple of data belongs. For example, the data availability control server can scan the data set (e.g., an index of the data) to identify a location within the data (e.g., a row of the data) that specifies the unique identifier, and then write the tuple to a memory location corresponding to the identified location (e.g., in a cell of the row).

As described above, the data availability control server 125 can maintain an access control list 127 that identifies the digital component providers 240 and/or other entities that have acquired access to one or more data sets and, for each entity, the data sets to which the entity has acquired access. In some implementations, the digital component distribution system 120 provides a user interface that allows digital component providers 240 and/or other entities to browse or search for data sets. For example, each data set may be labeled with a topic, data specifying the types of data included in the data set, and/or the resource from which the data of the data set was obtained. Digital component providers 240 can browse or search data sets based on the topics, types of data, and/or resources associated with the data sets.

In some implementations, the digital component distribution system 120 provides a sample of the data included in the data sets, e.g., without providing the user identifiers in the data sets. For example, the digital component distribution system 120 may provide, in response to a search query specifying one or more keywords, data sets that match the keywords and a sample of data included in each matching data set. A data set may match a query if the data set includes a topic, data type, or resource name matching a keyword of the query.

A digital component provider 240 may select one or more data sets to obtain access to the one or more data sets. In some implementations, the digital component providers 240 may be required to provide an amount of compensation for access to a data set. The amount may be specified by the publisher that provides the data included in the data set. In some implementations, the amount may be based on the type of data included in the data set. For example, some types of data (e.g., data specifying selected products or products added to a virtual shopping cart) may be more useful than data specifying search queries. In this example, the amount for data sets that include data specifying selected products or products added to a virtual shopping cart may be greater than the amount for data sets that include search queries. The amount for a data set can also be based on the number of user identifiers included in the data set, the number of types of data included in the data set, or a negotiated amount between the publisher and digital component provider (e.g., with an operator of the digital component distribution system acting as a mediator). In some implementations, a portion (or all) of the amount provided by digital component providers to acquire access to a publisher's data set may be provided to the publisher.

The front-end server 255 can receive digital component requests from client devices 230. For example, as described above, a web page or an application page of a mobile application may include code that, when executed by a web browser or the mobile application, causes the client device 230 to submit a digital component request to the digital component distribution system 120. A digital component request can include a user identifier for a user of the client device 230.

The front-end server 255 can provide the digital component requests, or data included in the digital component requests to the data availability control server 125. For example, the front-end server 255 may provide, to the data availability control server 125, data specifying the user identifier of the digital component request. In turn, the data availability control server 125 can use the access control list 127 and the data sets to determine which data sets include the user identifier (or another user identifier for the user) and, of those data sets, which data sets each digital component provider 240 has acquired access. For example, the data availability control server 125 can compare the user identifier to user identifiers in each data set to identify a set of zero or more data sets that include the user identifier. In another example, the data availability control server 125 may identify a universal user identifier for the user that is mapped to the received user identifier (e.g., an index or mapping of user identifiers for users may be stored in a data storage device of the data availability control server 125) and compare the universal user identifier to user identifiers in each data set to identity a set of zero or more data sets that include the universal user identifier. For each digital component provider, the data availability control server 125 can determine which, if any, of the data sets in the set of data sets the digital component provider has acquired access.

If the data availability control server 125 identifies, for a given digital component provider, one or more data sets that include the user identifier (or another user identifier for the user) and that the given digital component provider has acquired access, the data availability control server 125 can provide, to the given digital component provider, request data that includes activity data for the user identifier that is included in the one or more data sets. As described above, the number of data sets from which the given digital component provider may receive activity data for the user identifier may be limited to a specified number for each digital component request. If the identified one or more data sets include more data sets than the specified number, the data availability control server 125 can select one or more of the identified data sets (up to the specified number of data sets) from which to provide activity data. In other words, the availability control server 125 can filter the data sets in order to limit the number of data sets returned to the specified number. The filtering can be performed using various criteria. For example, the data availability control server 125 may select (or filter) the data set(s) based on an amount provided by the given digital component provider for access to the data sets, how recent the given digital component provider acquired access to the data sets, and/or a priority ranking of the data sets specified by the given digital component provider or the system.

The data availability control server 125 can provide the activity data for the user identifier included in the selected data set(s) (or from each of the identified one or more data sets if the number of data sets does not exceed the specified number) to the given digital component provider. For example, the data availability control server 125 can provide request data that includes the activity data to the front-end server 255 and the front-end server 255 can provide the request data to the given digital component provider. The front-end server 255 can also provide to the given digital component provider data related to the resource at which a digital component may be provided, e.g., with the request data. This data can include data identifying the resource, the location of a digital component slot on the resource, one or more search terms if the resource includes a search results page, and/or other appropriate data about the resource.

If the data availability control server 125 does not identify, for a given digital component provider, one or more data sets that include the user identifier (or another user identifier for the user) and that the given digital component provider has acquired access, the data availability control server 125 may not provide any activity data to the given digital component provider. For example, the user identifier may not be included in any of the data sets to which the given digital component provider has acquired access. Thus, the given digital component provider may not be eligible to receive activity data for the user identifier. Instead, the data availability control server 125 may provide to the given digital component provider request data that includes data related to the resource at which a digital component may be provided, e.g., data identifying the resource, the location of a digital component slot on the resource, one or more search terms if the resource includes a search results page, and/or other appropriate data about the resource.

The digital component providers 240 can each use the data received from the data availability control server 125 to determine whether it would like to include a digital component in a digital component selection process that is used to select a digital component to provide in response to the digital component request. As described in more detail, the digital component selection process can be performed by one or more digital component selection servers 260 to select a digital component to provide to the client device 210 in response to the digital component request. In some implementations, a computer of a digital component provider may use one or more rules to determine whether to include a digital component in the selection process, which digital component to include, and/or an amount that the digital component provider is willing to provide to the digital component distribution system 120 if the digital component is selected and provided to the client device 210.

The one or more rules may be applied to the request data received from the data availability control server 125. For example, the one or more rules of a digital component provider may specify that a digital component should be included in selection processes for digital component requests that specify a particular resource and/or a particular search term. If the request data specifies the particular resource and/or the particular search term, the computer of the digital component provider 240 may provide data specifying a digital component and/or an amount to the front-end server 255 of the digital component distribution system 120. The front-end server 255 can provide the data to the digital component selection server 260 for inclusion in the digital component selection process performed for the received digital component request.

In some implementations, the digital component distribution system 120 provides digital components in response to digital component requests in a very short amount of time (e.g., less than a second). In such examples, the digital component providers 240 must respond within a very short amount of time as well (e.g., less than 100 milliseconds). By providing only data from one or more data sets for the user identifier of a digital component request, the computers of the digital component providers 240 can process the data more quickly (e.g., using the one or more rules) and respond more quickly than if the computers were required to process entire data sets. In addition, the reduce amount of data allows the data to be transmitted more quickly between the front-end server 255 and the computers of the digital component providers 240.

The digital component selection server(s) 260 can select digital components to provide in response to digital component requests, e.g., based on the data received from the digital component providers 240, quality data for the digital components, and/or other appropriate data. For example, the digital component selection server 260 can perform a digital component selection process that ranks digital components based on a combination of the amounts provided for the digital components and the quality scores for the digital components. The digital component selection server 260 can provide (e.g., by way of the front-end server 255 and the network 220) one or more of the higher ranked digital components to the client device 230 that submitted the digital component request. The digital component selection server(s) 260 can store received digital components in a digital component data storage device 262. Note that as used herein, providing a digital component includes providing a link or network address of where a device can obtain the digital component (e.g., a third-party digital component server), such that the actual digital component need not be provided.

In some implementations, a third party system (e.g., a demand-side platform "DSP") may determine amounts (e.g., bids) for digital components (e.g., advertisements) for a digital component provider 240. For example, a DSP can be used to optimize amounts based on received data and to manage multiple accounts for a digital component provider 240. In such implementations, the front-end server 255 can provide the request data for the digital component provider to the third party system. In addition, publishers may configure their resources to prevent digital components from firing any pixels to retrieve cookies from client devices. Instead, the digital component providers 240 can set up their own data sets that can be sent with digital component requests to the third party system.

The data availability server 125 can also provide activity data in response to activity data requests. For example, an entity 280 (e.g., video streaming service, e-book service, etc.) may acquire access to one or more data sets in a similar manner as the digital component providers 240. The entity 280 can transmit an activity data request to the front-end server 255 over the network 220. The activity data request can specify a user identifier. The front-end server 255 can provide the activity data request (or the user identifier) to the data availability control server 125.

The data availability control server 125 can control access to the activity data included in data sets for these activity data requests by limiting the number of activity data requests that are fulfilled for each entity over a given time period. For example, each entity may be limited to a specified number of fulfilled activity data requests each day or each week. In another example, some entities may be allowed more activity data requests than others, e.g., based on an amount provided by each entity. In each example, the amount of user activity data that each entity can receive is limited, which reduces the amount of data that can be leaked.

In some implementations, the data availability control server 125 limits each entity 280 to a specified number of tuples of data that can be returned to the entity 280 over a specified time period. For example, one activity data request that specifies a particular user identifier may match user identifiers in multiple data sets to which the entity 280 has acquired access, resulting in multiple matching tuples of data that can be provided to the entity 280 in response to the request. Thus, the number of fulfilled requests may not equal the number of tuples of data provided to an entity 280.

In some implementations, digital component providers 240 may also be limited to a threshold number of digital component requests for which the digital component providers 240 receive activity data for users. For example, if a given digital component provider has received user activity data for the threshold number of requests over a given time period, the given digital component provider may not receive activity data for other requests until the next time period even if the user identifier of a request (or another user identifier for the user) matches a user identifier of a data set to which the given digital component provider has acquired access. Similarly, the digital component providers 240 may be limited to a specified number of tuples of data that the digital component providers 240 may receive over a given time period such that no more tuples of data are provided to the digital component providers until the next time period.

Figure 3:
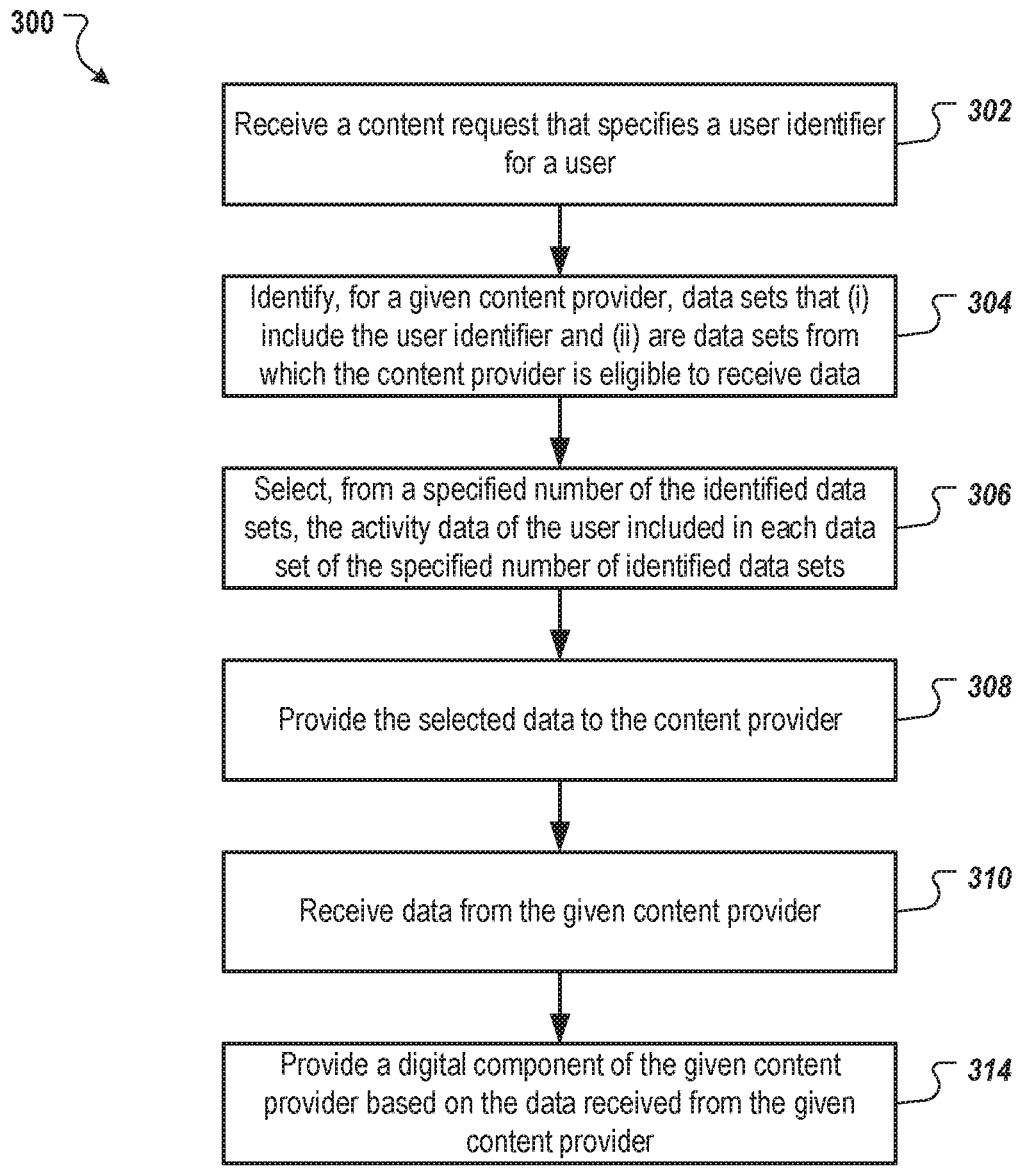
FIG. 3 is a flow diagram that illustrates an example process for providing a digital component while controlling access to user data to prevent data leakage.

FIG. 3 is a flow diagram that illustrates an example process 300 for providing a digital component while controlling access to user data to prevent data leakage. Operations of the process 300 can be implemented, for example, by a system that includes one or more data processing apparatus, such as the digital component distribution system 120 of FIGS. 1 and 2. The process 300 can also be implemented by instructions stored on a computer storage medium, where execution of the instructions by a system that includes a data processing apparatus cause the data processing apparatus to perform the operations of the process 300.

The system receives a digital component request (302). For example, a client device may transmit a digital component request to the system in response to loading a web page or application page that includes a digital component slot (e.g., a portion of the web page or application page that is reserved to present content from a third-party that differs from the provider of the web page or application page). The digital component request can include a user identifier for a user, e.g., that is associated with the user or a client device of the user.

The system identifies data sets for a given digital component provider (304). The system may identify data sets that include the user identifier (or another user identifier for the user such as a universal user identifier for the same user). The system can also examine those data sets that include the user identifier for data sets from which the digital component provider is eligible to receive data. The system may identify the data sets by comparing the user identifier (or another user identifier for the user) of the digital component request to user identifiers included in data sets to which the given digital component provider has acquired access. The system may perform this comparison for multiple digital component providers and identify data sets for each of the digital component providers.

The system selects, from a specified number of the identified data sets for the given digital component provider, activity data for the user identifier included in each data set of the specified number of identified data sets (306). In some implementations, the system or a provider of a data set may specify a maximum number of data sets from which activity data for a user can be provided to digital component provider in response to a single digital component request. For example, the user identifier for the user may be included in multiple data sets based on the user navigating to multiple different resources. To better protect the user's data, control access to user data, and prevent leakage of the data, the system can limit the number of data sets from which a user's activity data can be provided in response to a single request.

The system can select one or more of the identified data sets (up to the specified number of data sets) from which to provide activity data. For example, the system may select the data sets based on an amount provided by the given digital component provider for access to the data sets, how recent the given digital component provider acquired access to the data sets, and/or a priority ranking of the data sets specified by the given digital component provider or the system.

For each selected data set, the system can identify the data for the user identifier included in the data set. As described above the activity data can include user selected items, items added to a virtual shopping cart, search terms submitted in a search of the electronic resource, articles viewed at the resource, a time at which the user interaction occurred, and/or other appropriate data. The system can select activity data for the user identifier for each of multiple digital component providers in a similar way. The data selected for each digital component provider may vary based on the data sets to which the digital component provider has acquired access.

The system provides the selected activity data for the user identifier to the given digital component provider (308). For example, the system may transmit the data to a computer of the given component provider over a data communication network. The system may also transmit selected activity data that has been selected for other digital component providers to the computers of other digital component providers over the network.

The system receives data from the given digital component provider (310). The received data can specify a digital component and/or an amount that the digital component provider is willing to provide for sending the digital component to a client device of the user associated with the user identifier. The system can also receive similar data from other digital component providers.

The system provides a digital component based on the data received from the given content provider (312). For example, the system may select a digital component based on the data received from the given digital component provider and one or more other digital component providers. In some implementations the system may select the digital component based on a combination of a quality score for each digital component and the amount for each digital component specified in the data received from the digital component providers. The system may provide the digital component to the client device of the user associated with the user device by transmitting the digital component over a data communication network. The client device can present the received digital component to the user, e.g., in a digital component slot of a web page or application page.

Figure 4:
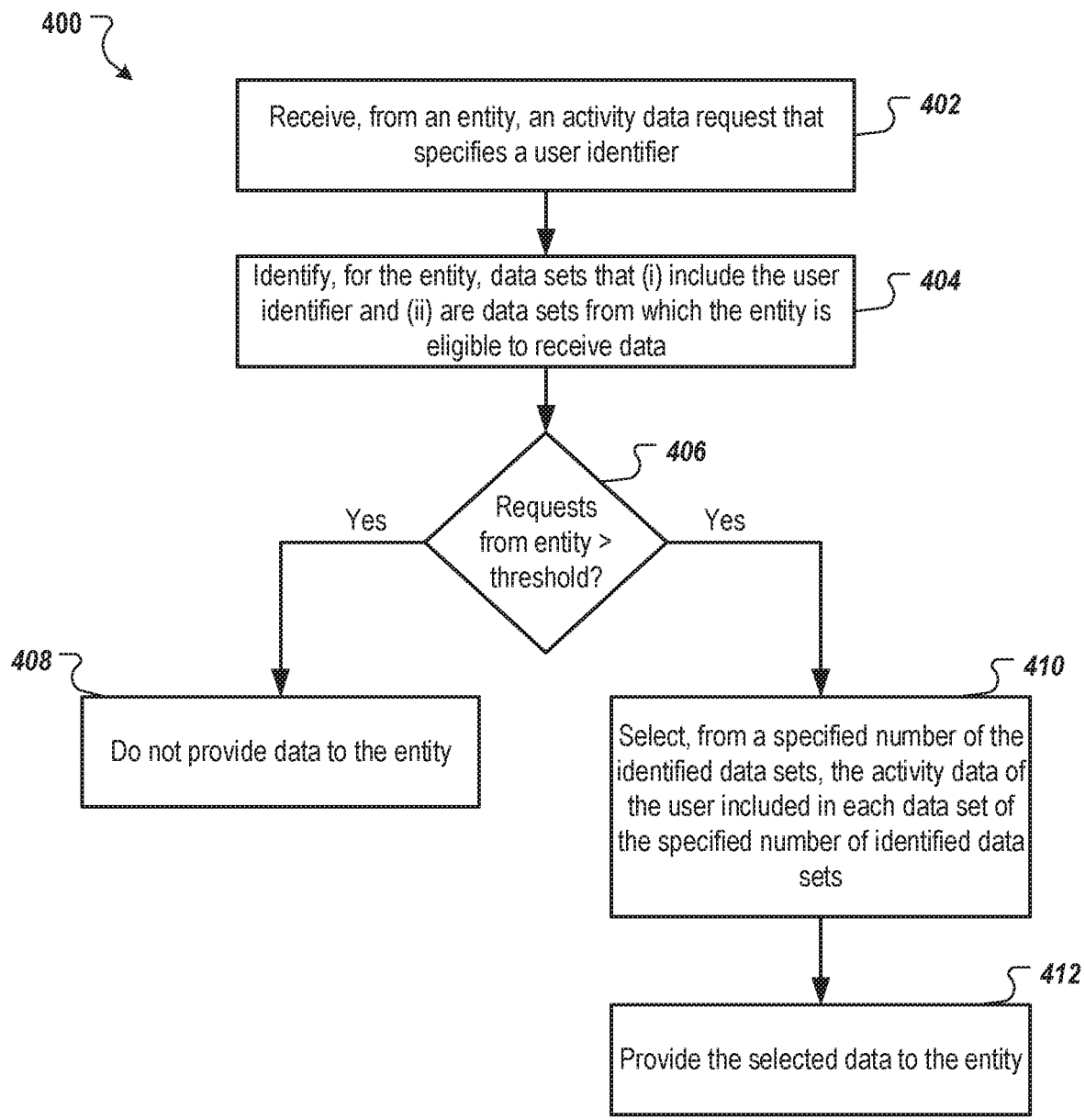
FIG. 4 is a flow diagram that illustrates an example process for providing data I a controlled way that prevents data leakage.

FIG. 4 is a flow diagram that illustrates an example process 400 for providing data I a controlled way that prevents data leakage. Operations of the process 400 can be implemented, for example, by a system that includes one or more data processing apparatus, such as the digital component distribution system 120 of FIGS. 1 and 2. The process 400 can also be implemented by instructions stored on a computer storage medium, where execution of the instructions by a system that includes a data processing apparatus cause the data processing apparatus to perform the operations of the process 400.

The system receives an activity data request from a given entity (402). For example, the given entity can acquire access to one or more data sets that include activity data for users associated with anonymous user identifiers. When the given entity would like data for a given user identifier, the given entity can submit an activity data request that specifies the given user identifier.

In a particular example, the entity may be an organization that provides recommendations or suggestions to users. The entity may provide the recommendations or suggestions automatically or in response to user requests. For example, the entity may be a video streaming service that provides movie or television show recommendations to users. The video streaming service may determine which movies or shows to recommend to a user based on the activity data for the user. When the video streaming service decides to provide a recommendation to a user, the video streaming service may provide an activity data request that specifies a user identifier for the user to the system.

The system identifies, for the entity, data sets that include the user identifier (or another user identifier for the user) and that are data sets from which the entity is eligible to receive activity data (404). The system may identify the data sets by comparing the user identifier of the activity data request to user identifiers included in data sets to which the entity has acquired access.

The system determines whether the number of activity data requests received from the entity is greater than a threshold (406). The system, or a publisher or other provider that provides data sets to the system, can limit the number of activity data requests that are fulfilled for a given entity to a threshold number of requests, e.g., over a given time period. For example, the system may limit an entity to a threshold of twenty requests per day. This threshold number of requests prevents the entity from recreating the data sets by submitting unlimited requests to the system, which prevents leakages of the data sets.

For publisher-specified thresholds, the system may limit the number of requests received from an entity that matched one or more of the publishers' data sets to a threshold number. For example, the publisher may limit each entity to ten fulfilled requests each day that include activity data from a data set provided by the publisher. A fulfilled request is one in which activity data is returned to the entity. To determine whether the number of activity data requests exceed the threshold, the system can determine the number of activity data requests received from the entity that specified a user identifier that matched a user identifier of one or more data sets received from the publisher and determine whether that number exceeds the publisher-specified threshold. In another example, the system can determine the number of activity data requests for which data from a data set received from the publisher was provided to the entity and determine whether that number exceeds the publisher-specified threshold.

If the number of activity data requests exceed the threshold, the system may determine to not provide activity data to the entity (408). Instead, the system may provide data to the entity informing the entity that the entity has received a maximum amount of activity data for the time period.

If the number of activity data requests do not exceed the threshold, the system selects, from a specified number of the identified data sets for the entity, activity data for the user identifier included in each data set of the specified number of identified data sets (410). In some implementations, the system or a publisher of other provider of a data sets may specify a maximum number of data sets from which activity data for a user can be provided to digital component provider in response to a single digital component request. For example, the user identifier for the user may be included in multiple data sets based on the user navigating to multiple different resources. To better protect the user's data, control access to user data, and prevent leakage of the data, the system can limit the number of data sets from which a user's activity data can be provided in response to a single activity data request.

The system can select one or more of the identified data sets (up to the specified number of data sets) from which to provide activity data. For example, the system may select the data sets based on an amount provided by the entity for access to the data sets, how recent the entity acquired access to the data sets, and/or a priority ranking of the data sets specified by the entity or the system.

The system provides the selected activity data for the user identifier to the given digital component provider (412). For example, the system may transmit the data to a computer of the entity over a data communication network. The entity may then user the data, e.g., to generate a recommendation or suggestion for a user associated with the user identifier.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A system for preventing data leakage, the system comprising:
   one or more servers each comprising one or more processors;
   one or more data storage devices that store:
   a plurality of data sets received from publishers, wherein each data set includes (i) one or more user identifiers for users that have visited an electronic resource of the publisher from which the data set was received and, for each user, (ii) activity data describing one or more actions performed by the user with respect to the electronic resource; and
   instructions executable by the one or more servers and that upon such execution cause the one or more servers to perform operations comprising:
   receiving digital component requests that each specify a user identifier for a user to which a digital component will be provided in response to the digital component request;
   providing digital components in response to the digital component requests;
   receiving data specifying a given user identifier for a given user specified by a given digital component request; and
   preventing leakage of activity data to digital component providers by:
   identifying, for a given digital component provider, data sets that (i) include a user identifier for the given user and (ii) are data sets from which the digital component provider is eligible to receive data;
   identifying, for the given digital component provider, a maximum number of data sets that the digital component provider is eligible to receive for one or more digital component requests received over each of multiple recurring time periods, wherein the maximum number is less than a total number of the identified data sets;

selecting a specified number of the identified data sets that is less than or equal to a difference between the maximum number of data sets and a current count of data sets provided to the digital component provider during a current time period;

selecting, from the specified number of the identified data sets, the activity data of the given user included in each data set of the specified number of the identified data sets; and providing the selected activity data to the given digital component.

2. The system of claim 1, wherein providing the selected activity data to the digital component provider comprises providing, by the one or more servers, the selected activity data to the given digital component provider without providing activity data for the given user included in any data set other than each data set of the specified number of the identified data sets.

3. The system of claim 1, wherein the selected activity data only comprises data for the given user.

4. The system of claim 1, wherein the operations comprise providing, by the one or more servers, a digital component of the given digital component provider to a user device of a user identified by the given user identifier based on data received from the given digital component provider in response to receiving the selected activity data.

5. The system of claim 1, wherein each data set includes one or more tuples of data and each tuple includes data types selected by the publisher from which the data set was received.

6. The system of claim 1, wherein:
the one or more servers are configured to perform further operations comprising:
receiving data specifying a particular user identifier for a particular user specified by a particular activity data request received from a particular entity;
identifying an additional plurality of data sets that (i) include the particular user identifier for the particular user and (ii) are data sets from which the particular entity is eligible to receive data;
determining that the particular entity has not requested activity data for greater than a threshold number of users during a specified time period;
in response to determining that particular entity has not requested activity data for greater than the threshold number of users during the specified time period:
selecting, from a particular number of the additional plurality of data sets, particular activity data of the particular user included in each data set of the particular number of the additional plurality of data sets; and
providing the selected particular activity data to the particular entity.

7. The system of claim 6, wherein determining that the particular entity has not requested activity data for greater than a threshold number of users during a specified time period comprises:
determining a number of activity data requests received from the particular entity that specified a user identifier that matched a user identifier of one or more data sets received from a particular publisher; and
determining that the number of activity data requests is not greater than a threshold specified by the particular publisher.

8. A computer-implemented method for preventing data leakage, the method comprising:
receiving, by one or more servers, digital component requests that each specify a user identifier for a user to which a digital component will be provided in response to the digital component request;
providing, by the one or more servers, digital components in response to the digital component requests;
receiving, by the one or more servers, data specifying a given user identifier for a given user specified by a given digital component request; and
preventing, by the one or more servers, leakage of activity data to digital component providers by:
identifying, for a given digital component provider and from a plurality of data sets received from publishers, data sets that (i) include a user identifier for the given user and (ii) are data sets from which the digital component provider is eligible to receive data, wherein each data set includes (i) one or more user identifiers for users that have visited an electronic resource of the publisher from which the data set was received and, for each user, (ii) activity data describing one or more actions performed by the user with respect to the electronic resource;
identifying, for the given digital component provider, a maximum number of data sets that the digital component provider is eligible to receive for one or more digital component requests received over each of multiple recurring time periods, wherein the maximum number is less than a total number of the identified data sets;
selecting a specified number of the identified data sets that is less than or equal to a difference between the maximum number of data sets and a current count of data sets provided to the digital component provider during a current time period;
selecting, from the specified number of the identified data sets, the activity data of the given user included in each data set of the specified number of the identified data sets; and
providing the selected activity data to the given digital component provider.

9. The method of claim 8, wherein providing the selected activity data to the digital component provider comprises providing, by the one or more servers, the selected activity data to the given digital component provider without providing activity data for the given user included in any data set other than each data set of the specified number of the identified data sets.

10. The method of claim 8, wherein the selected activity data only comprises data for the given user.

11. The method of claim 8, further comprising providing, by the one or more servers, a digital component of the given digital component provider to a user device of a user identified by the given user identifier based on data received from the given digital component provider in response to receiving the selected activity data.

12. The method of claim 8, wherein each data set includes one or more tuples of data and each tuple includes data types selected by the publisher from which the data set was received.

13. The method of claim 8, further comprising:
receiving, from a particular entity, a particular activity data request that specifies a particular user identifier for a particular user;
identifying an additional plurality of data sets that (i) include the particular user identifier for the particular user and (ii) are data sets from which the particular entity is eligible to receive data;

determining that the particular entity has not requested activity data for greater than a threshold number of users during a specified time period;

in response to determining that the particular entity has not requested activity data for greater than the threshold number of users during the specified time period:

selecting, from a particular number of the additional plurality of data sets, particular activity data of the particular user included in each data set of the particular number of the additional plurality of data sets; and providing the selected particular activity data to the particular entity.

14. The method of claim 13, wherein determining that the particular entity has not requested activity data for greater than a threshold number of users during a specified time period comprises:

determining a number of activity data requests received from the particular entity that specified a user identifier that matched a user identifier of one or more data sets received from a particular publisher; and determining that the number of activity data requests is not greater than a threshold specified by the particular publisher.

15. A non-transitory computer storage medium encoded with a computer program, the program comprising instructions that when executed by one or more data processing apparatus cause the data processing apparatus to perform operations comprising:

receiving digital component requests that each specify a user identifier for a user to which digital component will be provided in response to the digital component request;

providing digital components in response to the digital component requests;

receiving data specifying a given user identifier for a given user specified by a given digital component request; and preventing leakage of activity data to digital component providers by:

identifying, for a given digital component provider and from a plurality of data sets received from publishers, data sets that (i) include a user identifier for the given user and (ii) are data sets from which the digital component provider is eligible to receive data, wherein each data set includes (i) one or more user identifiers for users that have visited an electronic resource of the publisher from which the data set was received and, for each user, (ii) activity data describing one or more actions performed by the user with respect to the electronic resource;

identifying, for the given digital component provider, a maximum number of data sets that the digital component provider is eligible to receive for one or more digital component requests received over each of multiple recurring time periods, wherein the maximum number is less than a total number of the identified data sets;

selecting a specified number of the identified data sets that is less than or equal to a difference between the maximum number of data sets and a current count of data sets provided to the digital component provider during a current time period;

selecting, from the specified number of the identified data sets, the activity data of the given user included in each data set of the specified number of the identified data sets; and providing the selected activity data to the given digital component provider.

16. The non-transitory computer storage medium of claim 15, wherein providing the selected activity data to the digital component provider comprises providing, by the data processing apparatus, the selected activity data to the given digital component provider without providing activity data for the given user included in any data set other than each data set of the specified number of the identified data sets.

17. The non-transitory computer storage medium of claim 15, wherein the selected activity data only comprises data for the given user.

18. The non-transitory computer storage medium of claim 15, wherein the operations further comprise providing a digital component of the given digital component provider to a user device of a user identified by the given user identifier based on data received from the given digital component in response to receiving the selected activity data.

19. The non-transitory computer storage medium of claim 15, wherein each data set includes one or more tuples of data and each tuple includes data types selected by the publisher from which the data set was received.

20. The non-transitory computer storage medium of claim 15, wherein the operations further comprise:

receiving, from a particular entity, a particular activity data request that specifies a particular user identifier for a particular user;

identifying an additional plurality of data sets that (i) include a particular user identifier for the particular user and (ii) are data sets from which the particular entity is eligible to receive data;

determining that the particular entity has not requested activity data for greater than a threshold number of users during a specified time period;

in response to determining that the particular entity has not requested activity data for greater than the threshold number of users during the specified time period:

selecting, from a particular number of the additional plurality of data sets, particular activity data of the particular user included in each data set of the particular number of the additional plurality of data sets; and providing the selected particular activity data to the particular entity.

* * * * *